United States Patent [19]

Hunsaker et al.

[11] Patent Number: 5,680,213

[45] Date of Patent: Oct. 21, 1997

[54] OPTICS METHOD AND FIXTURE FOR ASSEMBLING AND TESTING A MAGNETIC HEAD

[75] Inventors: Michael D. Hunsaker, Ramona; Barry W. Darr, Oceanside, both of Calif.

[73] Assignee: Read-Rite Corporation, Milpitas, Calif.

[21] Appl. No.: 796,957

[22] Filed: Feb. 7, 1997

[51] Int. Cl.⁶ ................................................ G01B 9/02
[52] U.S. Cl. ............................................ 356/357; 356/354
[58] Field of Search ........................... 356/345, 351, 356/354, 357, 360

[56] References Cited

U.S. PATENT DOCUMENTS

5,475,488  12/1995  Fukuzawa et al. ................ 356/357
5,600,441   2/1997  De Groot et al. ................. 356/357

Primary Examiner—Frank G. Font
Assistant Examiner—Robert Kim
Attorney, Agent, or Firm—Nathan N. Kallman

[57] ABSTRACT

A method for optically testing a magnetic head having a slider and a suspension includes the steps of separately mounting the slider and the suspension in a test fixture. The slider is mounted in a cage and positioned relative to the suspension. The slider and the suspension are then tacked temporarily in place with a suitable adhesive. The magnetic head is flown over a glass disk and is illuminated through the glass disk with either a monochromatic or a polychromatic light beam. The operator then views the magnetic head through the glass disk with a microscope and observes the resulting diffraction interference patterns, which include bright and dark or colored bands. The operator analyzes the alignment of these bands, determines the pitch and roll errors of the magnetic head, and repositions either the slider or the suspension to correct for these errors.

13 Claims, 6 Drawing Sheets

OPTICS METHOD AND FIXTURE FOR ASSEMBLING AND TESTING A MAGNETIC HEAD

CROSS-REFERENCE TO RELATED APPLICATION

This application relates to copending U.S. patent application titled "Method and Fixture for Assembling and Electrical Testing of a Magnetic Head", Ser. No. 08/796,870 filed on Feb. 7, 1997, and assigned to the same assignee of the present application. The subject matter of the referenced application is incorporated herein by reference.

1. Field of the Invention

This invention relates to magnetic heads and in particular to improved optics methods and test fixtures for assembling and testing a magnetic head.

2. Description of the Prior Art

Magnetic read/write heads are increasingly more difficult to manufacture due to the tighter performance requirements and design tolerances set by the industry. During conventional head manufacturing, an air bearing slider is joined to a suspension. When the head assembly is completed, it is tested. However, once bonded, the components cannot be readily disassembled without damage.

One approach for using an optical method in the assembly of a slider to a suspension arm is described in U.S. Pat. No. 4,866,836 to Von Brandt, et al. The optical method uses a computer controlled optics system to determine the location of the geometric center of the slider and the situs of the suspension arm on which the slider is to be mounted. The computer then controls the apparatus which mounts the slider in the proper location on the suspension arm with the correct orientation. At the beginning of the assembly operation, both the slider and the suspension arm are placed on a tool holder that holds the arm and the slider in a spaced relationship. The tool holder is positioned under a microscope which scans and identifies the location of two marking holes and a dimple in the suspension. During this scanning operation, the optics system compares the situs of the centers of the two marking holes and the dimple, defines an imaginary line connecting the centers of the two marking holes, and then determines the amount by which the suspension arm is offset from a horizontal reference line. Subsequently, the optics system uses the various parameters it has measured to move the suspension arm so that the center of the dimple is moved to the position in which it is supposed to receive the center of the slider.

However, this optics method does not allow for the testing of the magnetic head under normal operating conditions, and for the independent repositioning of the slider and the suspension. As a result, some of the existing assembly and testing techniques are not completely accurate, since they selectively account for a minority of the tolerances affecting head performance.

SUMMARY OF THE INVENTION

An object of this invention is to provide an improved process for optimally positioning a slider relative to a magnetic head suspension, and for testing the magnetic head while flying under normal operating conditions.

Another object is to provide a process to improve flying height control, performance, and yield of the magnetic head by defining an optimal bonding point for the slider relative to the suspension.

Another object of this invention is to minimize the need for testing the magnetic head after the completion of the assembly, by determining, at the time of bonding, whether the slider is properly positioned.

A further object of this invention to automate and individualize the bonding process to join the slider to the suspension.

According to this invention, a method for optically testing a magnetic head includes the steps of separately mounting an air bearing slider and a suspension in a test fixture. The slider and the suspension are positioned relative to each other, and are then tacked temporarily in place with a suitable adhesive. The magnetic head is flown over a glass disk at a predetermined speed, and the magnetic head is illuminated through the glass disk with either a monochromatic or a polychromatic light beam. The operator then views the magnetic head through the glass disk with a microscope, and observes the resulting diffraction interference patterns. These interference patterns include bright and dark or colored bands. The operator analyzes the alignment of these bands, determines the pitch and roll errors of the magnetic head, and repositions either the slider or the suspension to a proper position.

BRIEF DESCRIPTION OF THE DRAWING

The invention will be described in greater detail with reference to the drawing in which.

Similar numerals refer to similar elements in the drawings. It should be understood that the dimensions of the different components in the drawings are not necessarily in exact proportion.

DETAILED DESCRIPTION OF THE INVENTION

Figure 1:
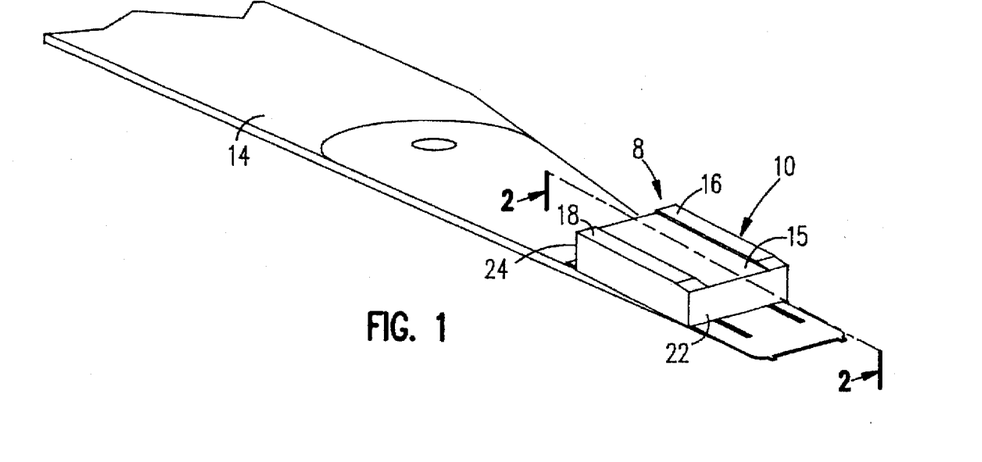
FIG. 1 is a partial isometric view of a magnetic head shown ready for testing, according to the present invention.
Figure 2:
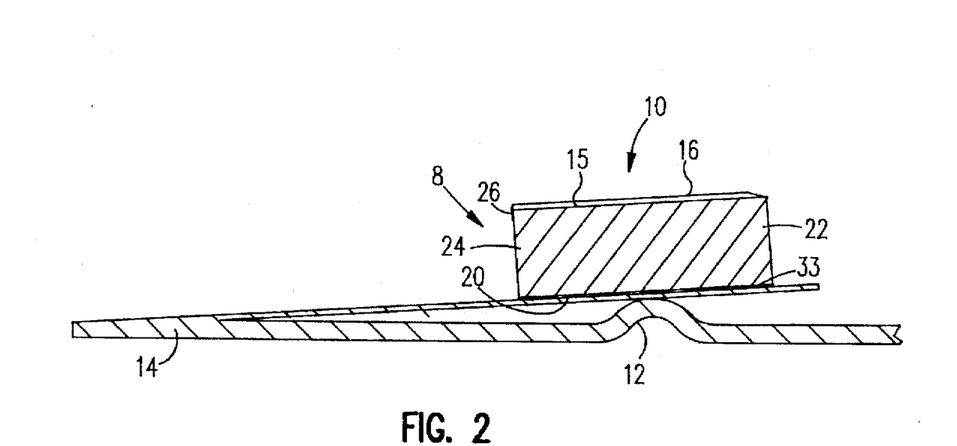
FIG. 2 is an enlarged sectional view of the magnetic head of FIG. 1 taken along line 2—2 and showing the quick-tack bonding of the slider to the suspension.

FIGS. 1 and 2 illustrate a magnetic head 8 comprised of an air bearing slider 10 positioned over a dimple 12 stamped in the end portion of a suspension 14 (partially shown). The slider 10 may be a conventional slider formed of ceramic material and has an air bearing surface (ABS) 15 having a topography that includes two side rails 16, 18 in this implementation, and a surface 20 opposite and generally parallel to the air bearing surface 15, a leading edge 22, and a trailing edge 24. At least one thin film transducer 26 is formed at the trailing end of the slider.

Figure 3:
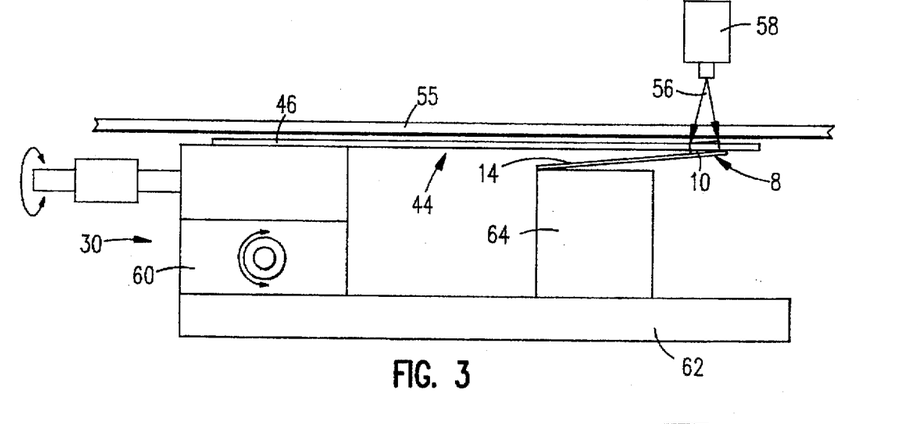
FIG. 3 is a side view of a first fixture used to position and test the magnetic head of FIG. 1 according to the present invention.
Figure 4:
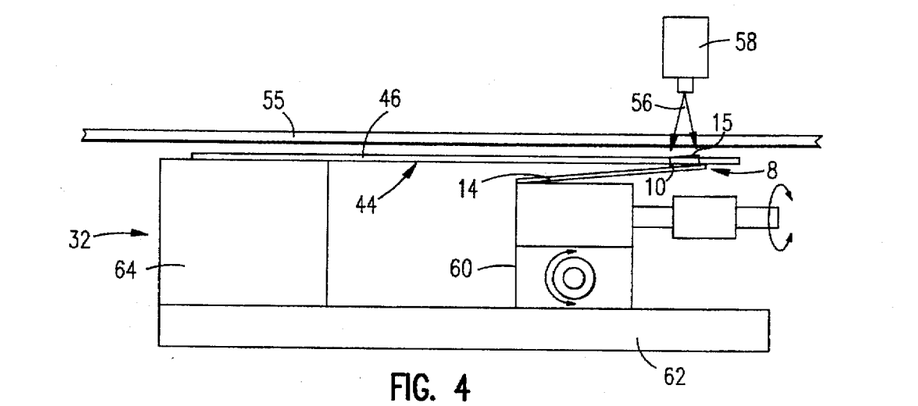
FIG. 4 is a side view of a second fixture used to position and test the magnetic head of FIG. 1 according to the present invention.

Prior to assembly, the slider 10 and the suspension 14 are mounted separately in a test fixture similar to the test fixture 30 shown in FIG. 3, or the test fixture 32 shown in FIG. 4. The slider 10 is preferably wired before mounting in the test fixture 30 or 32 with the air bearing surface 15 facing upward. Once the magnetic head 8 is mounted in the test fixture 30, 32, all subsequent assembly steps including testing and inspection will be performed at the test fixture 30, 32.

The slider 10 is maintained in place by a cage or fence 44. The cage 44 may include air bearings for friction free centering. The test fixture 30, 32 automatically, or the operator manually, then tacks the suspension 14, the slider 10 or both, by applying tack adhesive 33 (FIG. 2) or by any other means that establishes a temporary bond and which allows the repositioning of either the slider 10 or the suspension 14. The expression "tacks" is used to indicate that this bonding operation holds the bonded components in a temporary desired physical relationship during alignment and testing.

The suspension 14 is then loaded onto the surface 20 of the slider 10 by swinging or rotating the suspension 14 over the slider 10, and by temporarily positioning it close to the permanent bonding position. The slider 10 is optimally aligned relative to the suspension 14 at, or close to its nominal optimal flying attitude, so that its center of gravity is over the geometric center of the dimple 12, or within a predetermined offset distance therefrom. The slider 10 is then pressed against a transparent medium such as a glass disk 55 (FIGS. 3, 4) by the suspension 14.

The slider 10 is largely maintained in position by either the viscosity of the adhesive 33 or by the cage 44. A small application of heat or ultraviolet light, depending on the specific type of adhesive used, may be lightly applied to tack the slider 10 in an initial, loose position, or to increase the tackiness to a usable level. The magnetic head 8 is tested by flying the temporarily assembled magnetic head 8 over the glass disk 55. The magnetic head 8 is flown in order for the subsequent optical test to affect most of, if not all the flying tolerances, which are otherwise difficult to isolate and measure. The magnetic head 8 is illuminated through the disk 55 by means of either a monochromatic (i.e., fixed or single spectrum) light beam 56 such as a laser beam, or a polychromatic light beam such as white light. The operator views the magnetic head 8 through the glass disk 55 with a microscope 58 (FIGS. 3 and 4), and observes the light interference patterns generated by constructive and destructive diffractions of the light beam 56 off the slider 10 and the glass disk 55.

Initially, the trailing edge 24 is in contact or pseudo-contact with the disk 55, which contact is clearly visible to the operator. The disk speed is then gradually increased to operating speed until the trailing edge is lifted above the disk 55. The interference patterns, which will be explained later in connection with FIGS. 6 through 11 provide sufficient information to the operator to determine if the leading edge 22 of the slider 10 is lifted at an adequate flying attitude, such that the slider 10 is flying almost parallel to the surface of the disk 55. The number of interference bands and the disk speed information provide an accurate indication of the actual position of the slider 10 relative to its optimal location. If the flying attitude of the magnetic head 8 were adequate, the adhesive 33 will be hardened to a firm tack by dismounting the magnetic head 8 and applying heat for a final cure.

If the performance of the magnetic head 8 were not adequate, the slider 10 position relative to the suspension 14 is corrected by either moving the slider 10 relative to the suspension 14 using the test fixture 30, or alternatively by moving the suspension 14 relative to the slider 10 using the test fixture 32, until adequate dynamic performance characterized by the interference patterns is attained. The cage 44 is used to "bump" the slider 10 into position, backing off after each bump to permit free movement of the slider 10. Once adequate performance is reached, the slider 10 is firmly tacked into position, the magnetic head 8 is removed, and the adhesive 33 fully cured. Where flying height restrictions are particularly tight, the above alignment and testing process is repeated several times to determine the dependency of performance relative to the slider position. From such readings the test fixture 30 or 32 (or the operator) can deduce the attitude of the slider 10 and adjust for minimum flying attitude.

The correction of the slider position relative to the suspension 14 is achieved by analyzing the interference bands using conventional optics systems such as the microscope 58. The optimal position of the slider 10 is then determined for instance by calculation or by reference to a table or optical reference marks. Once the slider optimal position is determined, the repositioning of the slider 10 may be accomplished by a movable or robotic arm (not shown), while the slider 10 is still retained by the test fixture 30 or 32. Alternatively, the repositioning of the slider 10 may be accomplished by removing the magnetic head 8 from the test structure 30 or 32, breaking the bonding tacks 33, retacking the slider 10 in the proper location for optimal flying and magnetic performance, and then repositioning the magnetic head 8 in the test fixtures 30 or 32.

The assembly and testing processes can be automated either totally or in part. The reading and interpretation of the interference bands, as well as the repositioning and retacking of the slider 10 to the suspension 14 can be performed automatically on the test fixture 30 or 32.

FIGS. 3 and 4 illustrate two embodiments of the test fixtures used in positioning and testing the magnetic head 8. The test fixture 30 of FIG. 3 retains the suspension 14 in a fixed position and allows the slider 10 to move within parameters set by the cage 44. The test fixture 32 of FIG. 4 retains the slider 10 in a fixed position and allows the suspension 14 to move within parameters set by the cage 44.

Figure 5:
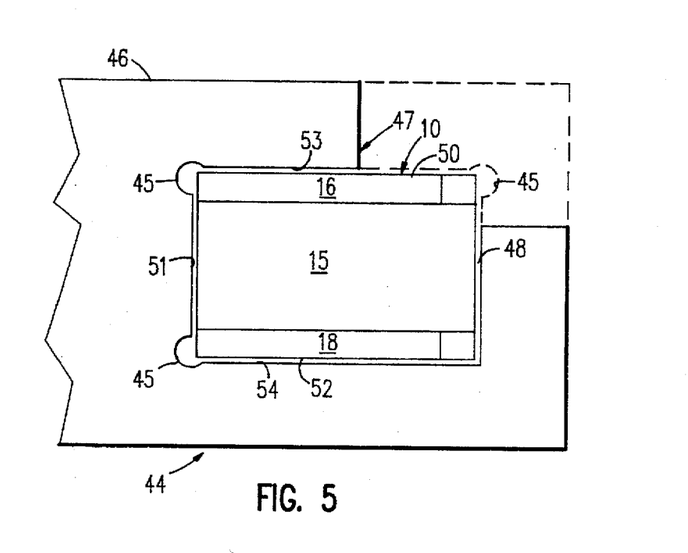
FIG. 5 is an enlarged top plan view of the slider shown mounted in either the test fixture of FIG. 3 or FIG. 4.

With reference to FIGS. 3, 4 and 5, the cage 44 includes a flat, thin elongated arm 46 which extends at its forward end into a notched section 47 that surrounds at least three of the four sides 48, 50, 51, 52 of the slider 10. The cage 44 is thinner than the slider 10 and is made of rigid material such as steel. For instance, if the slider 10 were 17 mils (milli-inches) thick, the cage 44 may be approximately 10 mils thick. The cage 44 remains parallel to the plane of the disk 55. As the disk 55 rotates, it generates a drag on the slider 10, forcing it against two of the three walls 53, 54 or 55 of the notched section 47 depending upon the angle of the slider relative to the axis 2—2 of the slider.

If the tack adhesive 33 were light, the slider 10 will move against one or two of the walls 53, 54 or 55 causing the tack adhesive 33 to break. In such event, the cage 44 will hold the slider 10 in a fixed position. The preferred cage design for light tack adhesive is illustrated in FIG. 5, which includes a C-design used when the positioning of the slider 10 depends on the motion of the cage 44 to push it into position. This design is referred to as the "floating technique", and it allows for some friction tolerance between the slider 10 and the suspension 14. One or more relief openings 45 are formed in the notched section 47 and a minimal clearance 56 is defined between the slider 10 and the wall 54 of the notched section 47 to provide better positioning control of the slider 10 within the notched section 47.

In the case where the tack adhesive 33 is not hardened and the slider 10 is not positioned by means of the cage 44 during flying, then the notched section 47 of the cage 44 is made to completely surround the four sides of the slider 10 (as illustrated by the dashed lines). Once the tack adhesive 33 is broken, the slider 10 may be replaced within a closed notch 48 formed within the notched section 47, and allowed to move freely without bonding. Alternatively, the slider 10 is moved to a new position relative to the suspension 14 using the cage 44, and then tacked into position. The cage 44 is then moved away from the slider 10 to eliminate contact between the cage 44 and the slider 10, in order to allow the slider 10 to reach its full flying state without any friction effect from the cage 44. This testing process may be repeated as many times as needed within the capabilities of the tack process used.

The test fixture 30 of FIG. 3 includes an X-Y positioner 60 that supports and retains the rearward end of the cage 44. The positioner 60 may be moved on a fixed base plate 62 in two directions X and Y, in order to correct for pitch and roll. The X-Y positioner 60 is locked in position when the final alignment is completed. The test fixture 30 also includes a stationary mounting block 64 that supports the suspension 14. The test fixture 32 of FIG. 4 includes the same components as the test fixture 30, except that the stationary mounting block 64 supports the cage 44, while the X-Y positioner 60 supports the suspension 14.

The testing of the magnetic head 8 is initiated by gradually rotating the disk 55, and by analyzing the interference patterns resulting from shining a light beam 56 provided by an optics system 58 through the transparent rotating magnetic disk 55, while the magnetic head 8 is in contact or pseudo-contact with the disk 55. The optics system includes a light source and a microscope. The light beam 56 is reflected by the glass disk 55 and generates a first reflected beam. Similarly, as the light beam 56 impinges upon the slider 10 part of the light beam 56 is reflected by the slider 10 to form a second reflected beam. The first and second reflected beams combine constructively and destructively to generate the light and dark bands, respectively. Note that some air bearing slider designs are of different construction requiring a modification of the interpretation of the generated light and dark bands. The two rail design is described herein for the purpose of illustration, but the invention is not necessarily limited to the disclosed design.

Figure 6:
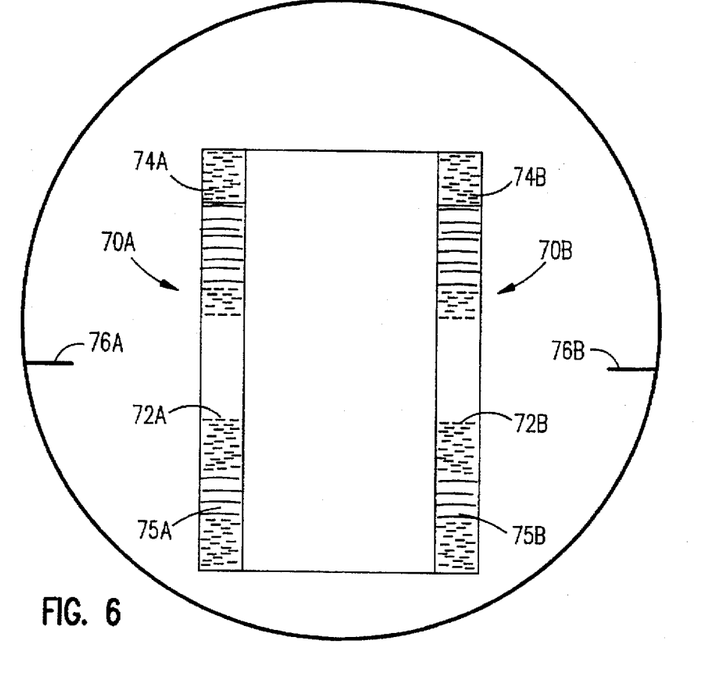
FIGS. 6 and 7 illustrate interference patterns generated by constructive and destructive diffractions of a monochromatic light beam off the slider and a rotating transparent disk.

FIG. 6 illustrates the outline of the slider 10 and two interference patterns 70A, 70B corresponding to the side rails 16, 18 respectively. The interference patterns 70A, 70B are viewed relative to a graduated reticle of the microscope 58, and result from a monochromatic light beam 56 being diffracted by the rotating disk 55 and the slider 10. The light beam 56 is generated by the optics system 58 which may be computer controlled. The interference patterns 70A, 70B include bright bands 72A, 72B respectively positioned between dark bands 74A, 75A, and 74B, 75B. After analyzing the interference patterns 70A, 70B, the operator or the test fixture 30 or 32 will ascertain whether the slider 10 and suspension 14 are well within an acceptable alignment range relative to each other, since the bright bands 72A and 72B are co-aligned and are further properly aligned relative to the limits of the reticles 76A, 76B of the microscope of the optics system 58, indicating minimal or no roll or pitch errors of the magnetic head 8.

Figure 7:
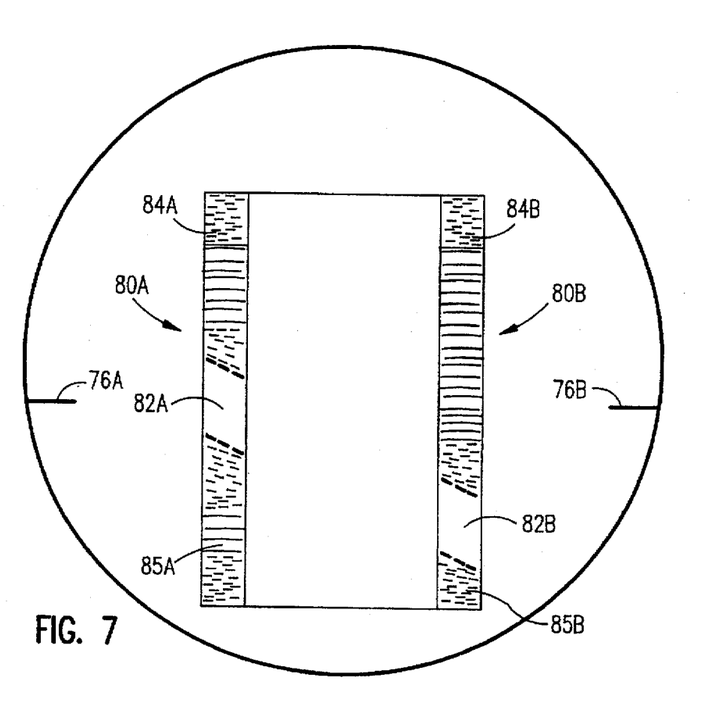

The two interference patterns 80A, 80B in FIG. 7 are generated by a monochromatic light beam 56 reflected by the rotating disk 55 and the slider 10. The interference pattern 80A includes a bright band 82A interposed between two dark bands 84A and 85A.

Similarly, the interference pattern 80B includes a bright band 82B interposed between two dark bands 84B and 85B. The bright bands 82A and 82B in this illustration are positioned at an angle relative to each other, indicating the presence of a roll error. The microscope reticles 76A, 76B are graduated, and the operator or the test fixture 30, 32 corrects for the detected pitch error. Since the misalignment error (i.e., pitch error) can be accurately determined by reference to a correction graph or table or additional reticle marks, the relative position of the slider 10 and the suspension 14 can be corrected without repeating the above test. However, the test may be repeated to obtain the desired level of accuracy.

Figure 8:
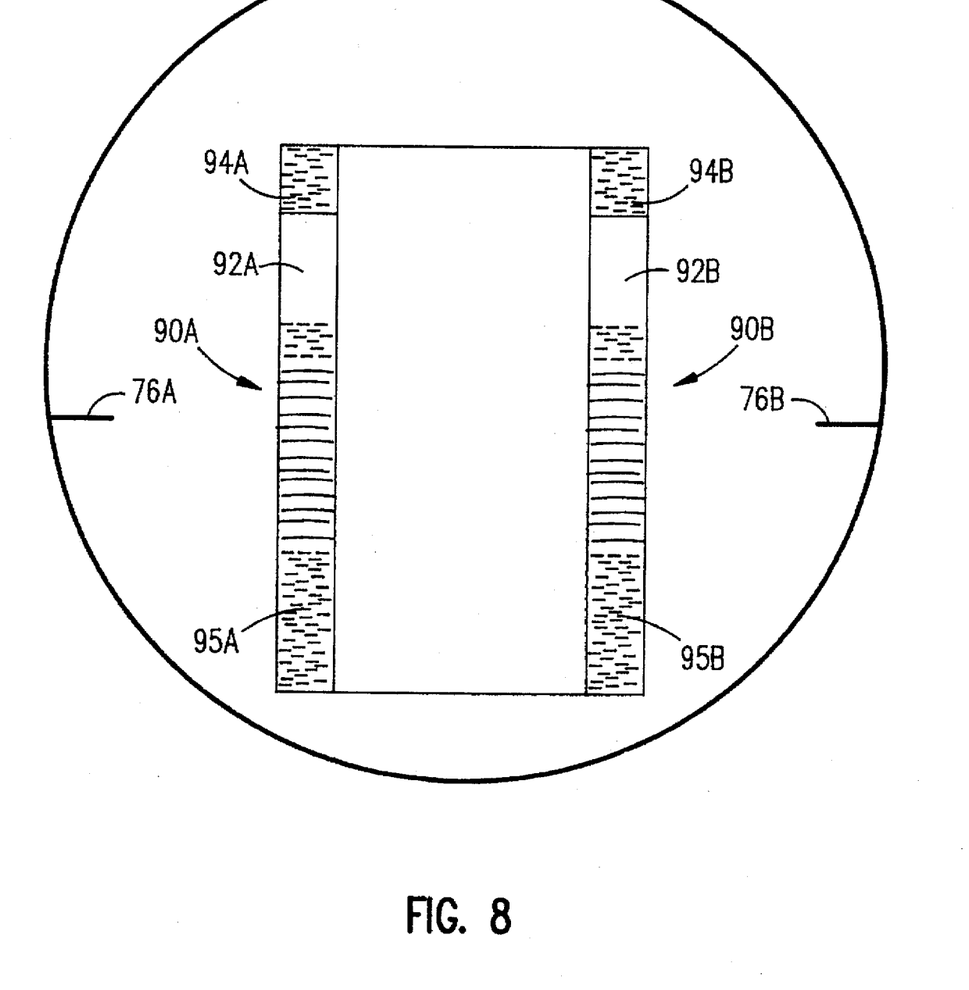
FIGS. 8, 9, 10, 11 and 12 illustrate interference patterns generated by constructive and destructive diffractions of a polychromatic light beam off the slider and the rotating transparent disk.

The two interference patterns 90A, 90B in FIG. 8 are also generated by a monochromatic light beam 56 reflected by the rotating disk 55 and the slider 10. The interference pattern 90A includes a bright band 92A interposed between a first dark band 94A and a second dark band 95A. Similarly, the interference pattern 90B includes a bright band 92B interposed between two dark bands 94B and 95B. The bright bands 92A, 92B in this illustration are aligned relative to each other but not relative to the microscope reticles 76A, 76B, indicating the presence of a tilt error in the slider position. The microscope reticles 76A, 76B are graduated, and the operator or the test fixture 30 or 32 is now able to correct for the detected tilt error.

In another example, the bright bands 92A, 92B are neither aligned with each other nor with the microscope reticles 76A, 76B, indicating the existence of both pitch and roll errors. The pitch and roll errors can be determined readily, accurately and inexpensively from the interference patterns using only a graduated reticle and/or a correction graph or table.

Figure 9:
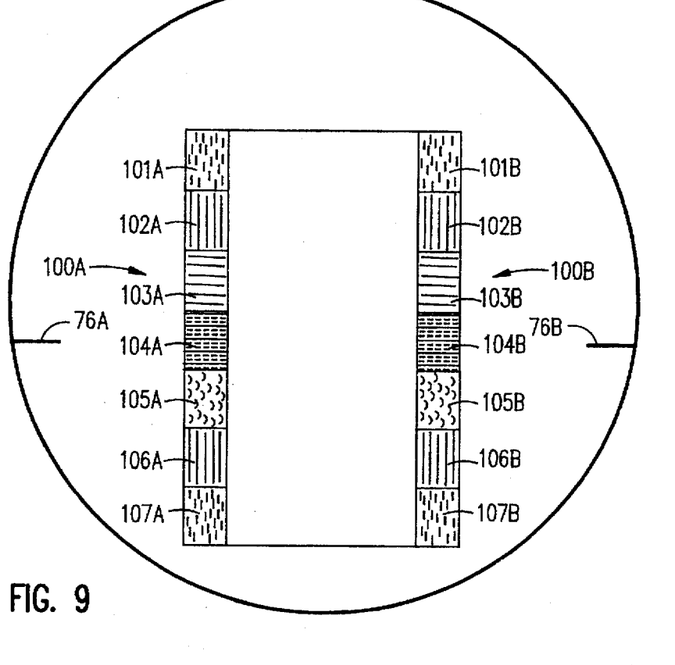

The two interference patterns 100A, 100B in FIG. 9 are generated by a polychromatic light beam 56 reflected by the rotating disk 55 and the slider 10. The interference pattern 100A includes a plurality of successive colored bands 101A, 102A, 103A, 104A, 105A, 106A, 107A, that correspond to the colored bands 101B, 102B, 103B, 104B, 105B, 106B, 107B, respectively, of the interference pattern 100B. In this illustration the corresponding colored bands are co-aligned and are further properly aligned relative to the microscope reticles 76A, 76B, indicating minimal or no roll or pitch errors of the magnetic head 8.

Figure 10:
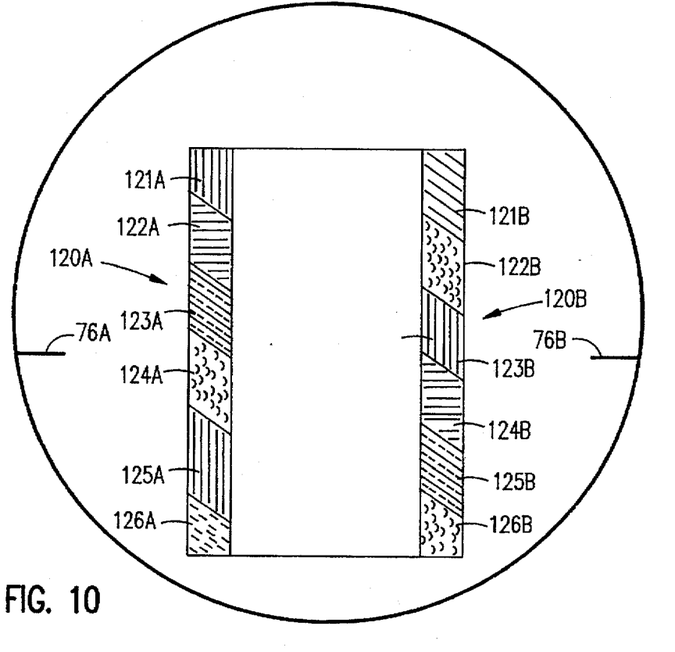

The two interference patterns 120A, 120B in FIG. 10 are also generated by a polychromatic light beam 56 reflected by the rotating disk 55 and the slider 10. The interference pattern 120A includes a plurality of successive colored bands 121A, 122A, 123A, 124A, 125A, 126A. Similarly, the interference pattern 120B includes a plurality of successive colored bands 121B, 122B, 123B, 124B, 125B, 126B. In this illustration the colored bands 121A, 122A, 123A, 124A correspond to, and are positioned at an angle relative to the colored bands 121B, 122B, 123B, 124B respectively, indicating that a roll error exists. The microscope reticles 76A, 76B are graduated, and the operator or the test fixture 30 or 32 corrects for the detected pitch error. The misalignment error (i.e., pitch error) can also be accurately determined by reference to a correction graph or table, and the relative position of the slider 10 and the suspension 14 can be corrected with a high degree of precision.

Figure 11:
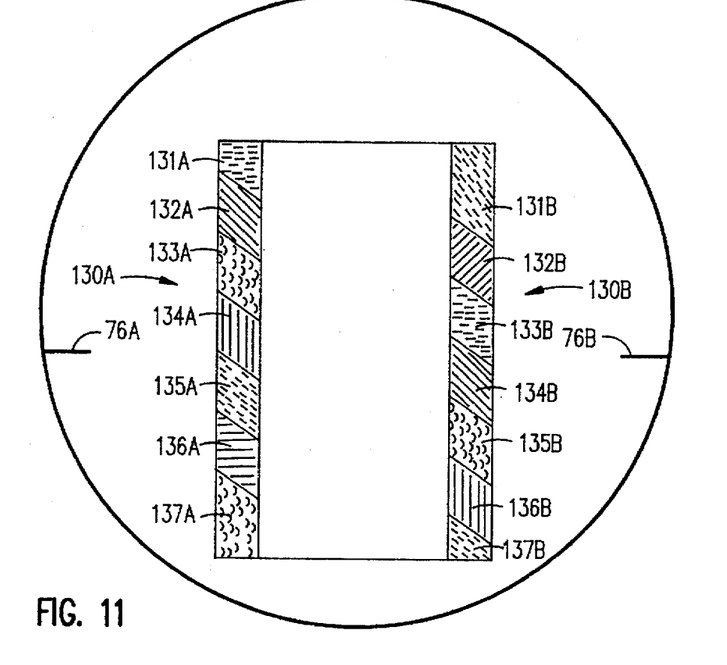

The two interference patterns 130A, 130B in FIG. 11 are also generated by a polychromatic light beam 56 reflected by the rotating disk 55 and the slider 10. The interference pattern 130A includes a plurality of successive colored bands 131A, 132A, 133A, 134A, 135A, 136A, 137A, that correspond to the colored bands 131B, 132B, 133B, 134B, 135B, 136B, 137B, respectively, of the interference pattern 130B. The colored bands in the two interference patterns 130A, 130B in this illustration are aligned relative to each other but not relative to the microscope reticles 76A, 76B, indicating that the slider 10 is still in proper pitch angle with the glass disk 55, but that it presents a roll tilt error. This tilt error can be corrected using the graduations of the microscope reticles 76A, 76B.

Figure 12:
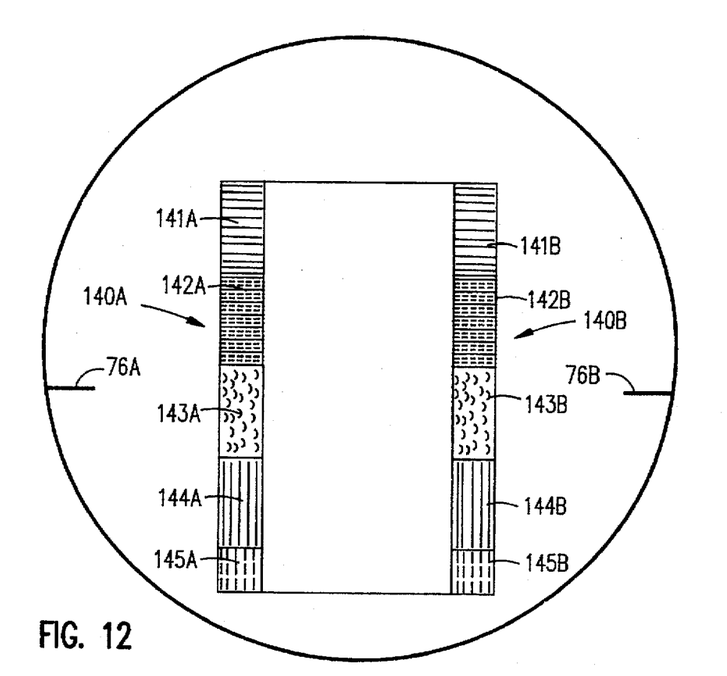

The two interference patterns 140A, 140B in FIG. 12 are generated by a polychromatic light beam 56 reflected by the rotating disk 55 and the slider 10. The interference pattern 140A includes a plurality of successive colored bands 141A, 142A, 143A, 144A, 145A, that correspond to the colored bands 141B, 142B, 143B, 144B, 145B, respectively, of the interference pattern 140B. The colored bands in the two interference patterns 140A, 140B are aligned relative to each other but not relative to the microscope reticles 76A, 76B. In this illustration the widths of the colored bands 141A–145A and 141B–145B (FIG. 12) are larger than the widths of the colored bands 131A–137A and 131B–137B (FIG. 11), or displaced from their nominal position, indicating that the pitch error of the slider 10 is excessive, and that the slider 10 is no longer in proper contact with the glass disk 55. This tilt error can be corrected using the graduations of the microscope reticles 76A, 76B.

It should be understood that the geometry, dimensions and parameters described above may be modified within the scope of the invention.

What is claimed is:

1. A method for optically testing a magnetic head having a slider and a suspension, the method comprising the steps of:

mounting the suspension in a test fixture including a cage;

mounting the slider in said cage;

positioning the slider relative to the suspension and maintaining the slider position by means of said cage;

establishing a temporary bond between the slider and the suspension;

spinning a transparent medium;

directing a light beam through said transparent medium onto the slider for generating diffraction interference patterns;

determining from said diffraction interference patterns whether the slider is properly positioned relative to the suspension; and correcting the slider position relative to the suspension based upon said diffraction interference patterns.

2. The method according to claim 1, wherein said step of establishing a temporary bond comprises applying quick tack adhesive between the slider and the suspension.

3. The method according to claim 1, including the step of permanently bonding the slider and the suspension when the slider is properly positioned relative to the suspension.

4. The method according to claim 1, wherein said step of correcting the slider position relative to the suspension comprises moving the slider and retaining the suspension in a fixed position.

5. The method according to claim 1, wherein said step of correcting the slider relative position relative to the suspension comprises moving the suspension and retaining the slider in a fixed position.

6. The method according to claim 1, wherein said step of directing includes directing a monochromatic light beam.

7. The method according to claim 6, wherein said step of directing said light beam generates two diffraction interference patterns corresponding to the topography of the slider, such that each diffraction interference pattern includes bright and dark bands.

8. The method according to claim 7, wherein said step of determining whether the slider is properly positioned relative to the suspension includes the steps of analyzing and comparing the alignment of said bright and dark bands.

9. The method according to claim 8, wherein said step of analyzing includes determining roll and pitch errors based on graduated optical reticles of an optical system.

10. The method according to claim 1, wherein said step of directing comprises directing a polychromatic light beam.

11. The method according to claim 10, wherein said step of directing said light beam generates two diffraction interference patterns corresponding to two rails of the slider, such that each diffraction interference pattern includes colored bands.

12. The method according to claim 11, wherein said step of determining whether the slider is properly positioned relative to the suspension includes the steps of analyzing and comparing the alignment of said colored bands.

13. The method according to claim 12, wherein said steps of analyzing and comparing comprises determining roll and pitch errors based on graduated reticles of an optical system.

* * * * *